(12) United States Patent
Steinberger et al.

(10) Patent No.: US 6,374,692 B1
(45) Date of Patent: Apr. 23, 2002

(54) SHIFT ROCKER FOR A CHANGE-SPEED GEARBOX, AND PROCESS OF MAKING A SHIFT ROCKER

(75) Inventors: Wolfgang Steinberger, Herzogenaurach; Klaus Krämer, Baudenbach; Arnold Trissler, Herzogenaurach, all of (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/552,968

(22) Filed: Apr. 20, 2000

(30) Foreign Application Priority Data

Apr. 28, 1999 (DE) .......................................... 199 19 271

(51) Int. Cl.⁷ .............................................. B60K 20/00
(52) U.S. Cl. .................................................. 74/473.37
(58) Field of Search .......................... 74/473.36, 473.37

(56) References Cited

U.S. PATENT DOCUMENTS

H295 H * 7/1987 Numazawa et al. ...... 74/473 R
5,802,916 A 9/1998 Ebinger et al. ................ 74/360

FOREIGN PATENT DOCUMENTS

| DE | 9 41 713 | 10/1955 |
| DE | AS 11 22 385 | 1/1962 |
| DE | 89 02 040 U1 | 7/1989 |
| EP | 07 94 364 A2 | 9/1997 |
| JP | 359027736 A | * 2/1984 |

* cited by examiner

*Primary Examiner*—David Fenstermacher
(74) *Attorney, Agent, or Firm*—Henry M. Feiereisen

(57) ABSTRACT

A shift device for a change-speed gearbox, includes a shift rocker having sidewalls for axially displacing a shift sleeve positively connected to a gear wheel clutch or synchronizing unit. A shift finger is fixedly mounted on a shift shaft and positively engages a shift slot of the shift rocker to operate the shift rocker. The shift rocker is of single-piece configuration and made through a non-cutting process, with a blank being pre-punched from a steel sheet, before the blank is shaped into a finished product by at least one bending operation.

17 Claims, 1 Drawing Sheet

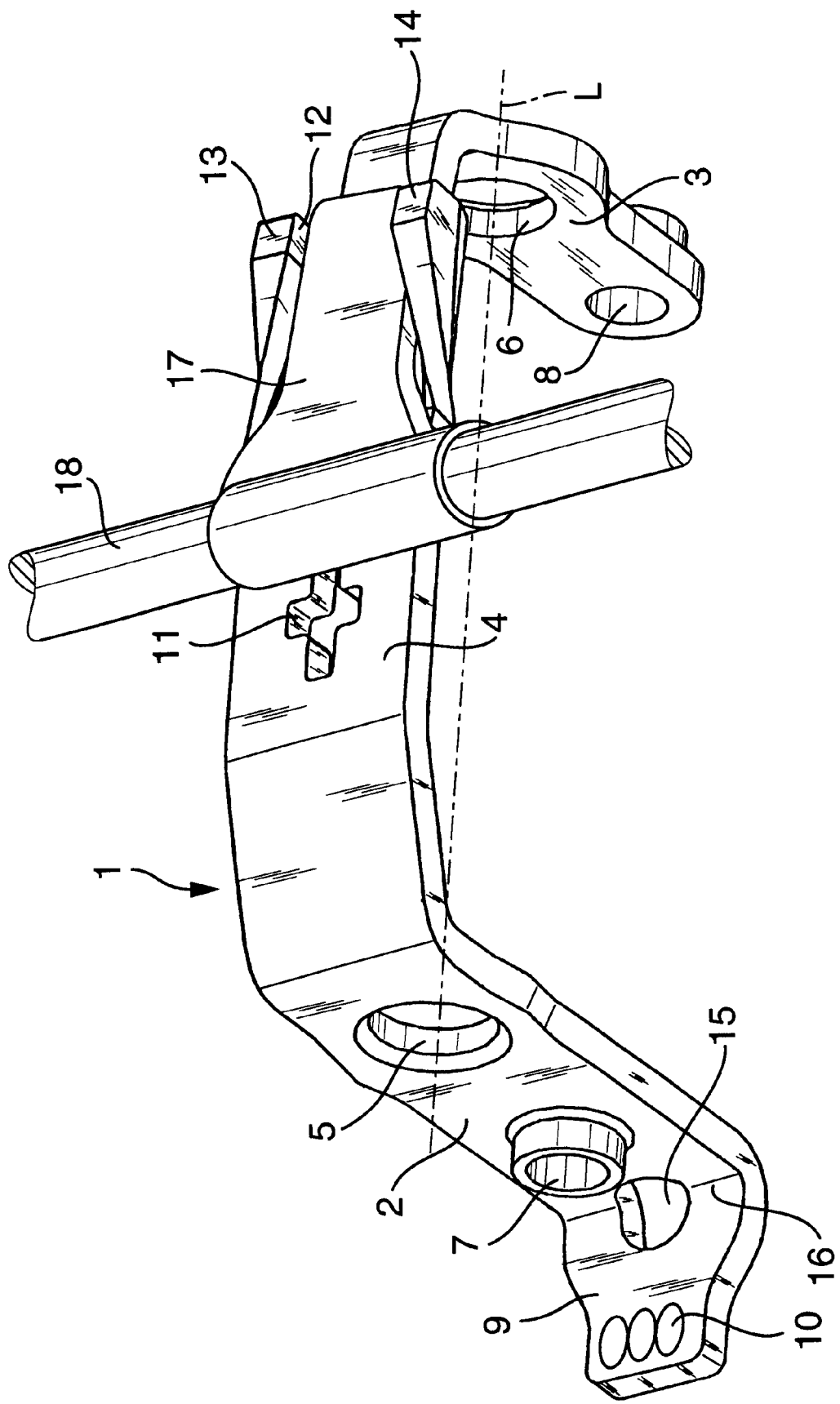

SHIFT ROCKER FOR A CHANGE-SPEED GEARBOX, AND PROCESS OF MAKING A SHIFT ROCKER

CROSS-REFERENCES TO RELATED APPLICATIONS

This application claims the priority of German Patent Application, Serial No. 199 19 271.5, filed Apr. 28, 1999, the subject matter of which is incorporated herein by reference.

BACKGROUND OF THE INVENTION

The present invention relates, in general, to a shift device of a change-speed gearbox of motor vehicles, and more particularly to a shift rocker used in a shift device.

In general, change-speed gearboxes are provided with synchronizing units known also as gear wheel clutches. During gearshift, a U-shaped shift rocker is used to axially displace a shift sleeve that interacts with the gear wheel clutch for optionally shifting a gear wheel when changing gears of the change-speed gearbox.

U.S. Pat. No. 5,802,916, issued on Sep. 8, 1998, describes a U-shaped shift rocker which is composed of at least two structural parts and encloses the shift sleeve by an angle of more than 180°. The shift rocker has parallel sidewalls which have end portions formed with receiving bores for guiding the shift sleeve via journals. At a radial distance to the receiving bores, the shift rocker is rotatably supported in pivot bearings which are formed by bolts fixedly arranged in the gearbox housing or in the shift device. The sidewalls are interconnected by a cross member which has attached thereon in the mid-section area of the shift rocker a driver which is guided along a longer region axially to the outer contour of the shift rocker. The driver has an angled portion which is formed with a recess to form a shift slot for a positive engagement of a shift finger which is fixedly secured to a shift shaft. The arrangement of the driver in the conventional shift rocker results in a force introduction offset to the center of the shift rocker, to realize a shifting, i.e. a rotation of the shift rocker. The shift rocker further includes, axially offset to the driver, a radial bracket for swingably mounting a locking lever of a locking unit. This conventional shift rocker is made up of many structural parts which are connected to one another through welding. This is disadvantageous because the multiplicity of structural parts adversely affects the weight, and the welding operation requires additional measures to effectively eliminate distortions as a result of the welding.

SUMMARY OF THE INVENTION

It is thus an object of the present invention to provide an improved shift rocker, obviating the afore-stated drawbacks.

In particular, it is an object of the present invention to provide an improved shift rocker which is optimized as far as weight is concerned and cost-efficient while yet able to satisfy demands as far as strength requirements are concerned.

These objects, and others which will become apparent hereinafter, are attained in accordance with the present invention by providing a shift rocker which is activated through operation of a shift finger, fixedly mounted on a shift shaft, for axially displacing a shift sleeve that is positively connected to a gear wheel clutch or synchronizing unit, with the shift rocker having parallel sidewalls and including a shift slot for positive engagement of the shift finger, and a latch contour for interaction with a stationary shift latching means, whereby the shift rocker is of single-piece configuration and made through a non-cutting process from a blank which is pre-punched from a steel sheet, before being shaped into a finished product by one or more bending operations.

A shift rocker in accordance with the present invention possesses significant weight advantages as a consequence of its single-piece design. Problems experienced with welding operations, such as distortions, are no longer of any concern and thus no additional measures are required, and the overall production costs for a shift rocker of the invention are noticeably less when compared to conventional multi-part shift rockers.

According to another feature of the present invention, the sidewalls are formed from the punched sheet metal strip without punch-out holes from a solid blank, thereby assuring a maximum strength of the shift rocker. By omitting punch-out holes, a further working step is eliminated, further reducing the production costs of the shift rocker.

According to another feature of the present invention, the shift rocker has a cross member, which interconnects the sidewalls, and is provided on both sides with outwardly directed lugs which are formed in one piece with the cross member. After punching the blank, the lugs are bent in a direction away from the sidewalls at a right angle into a parallel relationship to form the shift slot for engagement of a shift finger. Suitably, the shift slot may be disposed substantially in a midsection of the shift rocker to realize a symmetric force introduction in the midsection of the shift rocker, thereby positively affecting the shifting operation and the shifting comfort.

The single-piece configuration of the shift rocker according to the present invention also allows the formation of a latch contour by which the shift rocker can be secured in place in conjunction with a separate, stationary shift latching means. Accordingly, one of the sidewalls has an end portion which is flanged outwardly, preferably at a right angle, along a bending line, with the latch contour of the shift rocker being disposed in the end portion of the one sidewall. Suitably, the latch contour may be impressed during a further bending operation in the respective portion of a sidewall, without requiring further refinishing steps. The one sidewall may have a punch-out hole in an area of the bending line for facilitating formation of the end portion.

BRIEF DESCRIPTION OF THE DRAWING

The above and other objects, features and advantages of the present invention will be more readily apparent upon reading the following description of a preferred exemplified embodiment of the invention with reference to the accompanying drawing, in which FIG. 1 is a perspective illustration of a shift rocker according to the present invention.

DETAILED DESCRIPTION OF PREFERRED EMBODIMENTS

Turning now to FIG. 1, there is shown a perspective illustration of a shift rocker according to the present invention, generally designated by reference numeral 1. The shift rocker has a U-shaped configuration and includes two spaced-apart sidewalls 2, 3 ("open-jawed sidewalls") arranged in parallel disposition, and an arched cross member 4 which interconnects the sidewalls 2, 3. The sidewalls 2, 3 are formed with aligned receiving bores 5, 6 for fixed engagement of trunnions (not shown) of an inner shift device for formation of pivot bearings of the shift rocker 1, with the bores 5, 6 defining a longitudinal axis L. At their free end, each of the sidewalls 2, 3 is provided with a bearing bushing 7, 8 for articulation of a shift sleeve (not shown), when the shift rocker 1 is assembled. The sidewall 2 is extended by a portion 9 which is flanged radially outwardly at a right angle to extend parallel to the cross member 4. The portion 9 is formed on one side, i.e. pointing in the direction of the bearing bushing 7, with a latch contour 10. In assembled state of the shift rocker 1, the latch contour 10 interacts with a shift latching means (not shown) to ensure a precise disposition in the respective position of the shift rocker 1.

The cross member 4 has a central portion which extends in parallel relation to the longitudinal axis L and is provided with a cross-shaped recess or opening 11 for guiding and securing a locking lever (not shown) in position which is swingably connected in the recess by a cylindrical pin (not shown). In this context, reference is also made to commonly assigned co-pending patent application by a same inventive entity, entitled "Locking Lever for a Shift Rocker", filed simultaneously herewith and based on unpublished German patent specification 199 19 269.3, the disclosure of which is incorporated herein by reference.

Offset to the recess 11, the shift rocker 1 includes a shift slot 12 for positive engagement of a shift finger 17, which is fixedly secured to a shift shaft 18, when the shift rocker 1 is assembled. The shift slot 12 is defined by two laterally disposed lugs 13, 14 which are formed in one piece with the cross member 4 of the shift rocker 1 and are bent outwardly at a right angle with respect to the cross member 4, with the axial distance between the lugs 13, 14 laterally demarcating the shift slot 12.

The shift rocker 1 according to the present invention is of single-piece configuration and made through a non-cutting process. In a first working step, a blank is punched out from a sheet metal strip. Subsequently, the blank is shaped by several bending operations. For example, in a first bending operation, the cross member 4 of the shift rocker 1 can be initially shaped before the sidewalls 2, 3 are then formed, without requiring punch-out holes that reduce the strength properties. The end portion 9 of the sidewall 2, provided with the latch contour 10, can thereby be flanged outwardly at a right angle. This bending operation may, optionally, be simplified by incorporating in the area of a bending line 16 in the transition zone between the portion 9 and the sidewall 2 a punch-out hole 15. A final bending operation includes the bending of the lugs 13, 14 to form the shift slot 12. Persons skilled in the art will understand that the formation of the shift slot 12 through bending the lugs 13, 14, may certainly be carried out at a same time or in synchronism with any one of the preceding shaping steps.

The configuration of the shift rocker 1 in accordance with the present invention eliminates the need for refinishing steps after all bending operations have been carried out. All openings or impressions, such as the recess 11 the receiving bores 5, 6, the bearing bushings 7, 8 and the latch contour 10, may be provided in the blank prior to the bending operations. The subsequent shaping of the blank can be executed at an accuracy which can be realized within the preset and standardized tolerances with respect to position and shape of the shift rocker 1.

While the invention has been illustrated and described as embodied in a shift rocker for a change-speed gearbox, and process of making a shift rocker, it is not intended to be limited to the details shown since various modifications and structural changes may be made without departing in any way from the spirit of the present invention.

What is claimed as new and desired to be protected by Letters Patent is set forth in the appended claims:

1. An inner shift device for a change-speed gearbox, comprising:
   a shift rocker having sidewalls for axially displacing a shift sleeve positively connected to a gear wheel clutch or synchronizing unit, said shift rocker including a shift slot and a latch contour;
   a shift finger fixedly mounted on a shift shaft and positively engaged in the shift slot of the shift rocker for rotating the shift rocker;
   a stationary shift latching means interacting with the latch contour of the shift rocker,
   wherein the shift rocker is of single-piece configuration and shaped from a pre-punched blank of steel sheet into a finished product through a non-cutting process including at least one bending operation.

2. The shift device of claim 1 wherein the sidewalls are arranged in parallel disposition and shaped from a solid blank.

3. The shift device of claim 1 wherein the shift rocker has a cross member, which interconnects the sidewalls, and two lugs formed in one piece with the cross member to form the shift slot, said lugs being formed, after punch-out of the blank, in a direction away from the sidewalls at a right angle in a parallel relationship.

4. The shift device of claim 3 wherein the shift slot is so disposed on the shift rocker that the shift finger applies a force in substantially central direction into the shift rocker.

5. The shift device of claim 1 wherein one of the sidewalls has an end portion which is flanged outwardly along a bending line, said latch contour of the shift rocker being disposed in the end portion of the one sidewall.

6. The shift device of claim 5 wherein the one sidewall has a punch-out hole in an area of the bending line for facilitating formation of the end portion.

7. A shift rocker for use in a shift device for a change-speed gearbox, comprising a body member activated through operation of a shift finger, said body member having a single-piece configuration including parallel sidewalls and a shift slot for positive engagement of the shift finger, and a latch contour for interaction with a stationary shift latching means, said shift rocker being made through a non-cutting process from a blank which is punched from a steel sheet, before being shaped into a finished product by at least one bending operation.

8. The shift rocker of claim 7 wherein the sidewalls are arranged in parallel disposition and shaped from a solid blank.

9. The shift rocker of claim 7 wherein the body member includes a cross member, which interconnects the sidewalls, and two lugs formed in one piece with the cross member to form the shift slot, said lugs being formed, after punch-out of the blank, in a direction away from the sidewalls at a right angle into a parallel relationship.

10. The shift rocker of claim 9 wherein the shift slot is so disposed on the cross member that a substantially central force introduction into the shift rocker is ensured via the shift finger.

11. The shift rocker of claim 7 wherein one of the sidewalls has an end portion which is flanged outwardly along a bending line, said latch contour of the body member being disposed in the end portion of the one sidewall.

12. The shift rocker of claim 11 wherein the one sidewall has a punch-out hole in an area of the bending line for facilitating formation of the end portion.

13. A process of manufacturing a shift rocker for use in a shift device for a change-speed gearbox, comprising the steps of pre-punching a blank from a steel sheet, and subsequently shaping the blank into a finished single-piece shift rocker by subjecting the blank to at least one bending operation.

14. The process of claim 13, wherein the blank has opposite ends which are bent to form parallel sidewalls.

15. The process of claim 14 wherein one of the sidewalls is extended with respect to the other one of the sidewalls by a portion which is bent outwardly for incorporation of a latch contour for interaction with a shift latching means.

16. The process of claim 15, and further comprising the step of punching out a hole in a junction area between the one sidewall and the portion for facilitating the bending operation.

17. The process of claim 13 wherein the blank has projecting parts extending laterally from the blank, said projecting parts being bent at a right angle into parallel confronting disposition to form lugs which define a shift slot for engagement of a shift finger.

* * * * *